Nov. 19, 1946.   H. L. CARD   2,411,365
DISH DRIER
Filed Oct. 6, 1944   2 Sheets-Sheet 1

Inventor
HARROLD L. CARD,

By Clarence A. O'Brien
and Harvey B. Jacobson
Attorneys

Nov. 19, 1946.　　　　　H. L. CARD　　　　　2,411,365
DISH DRIER
Filed Oct. 6, 1944　　　　2 Sheets-Sheet 2
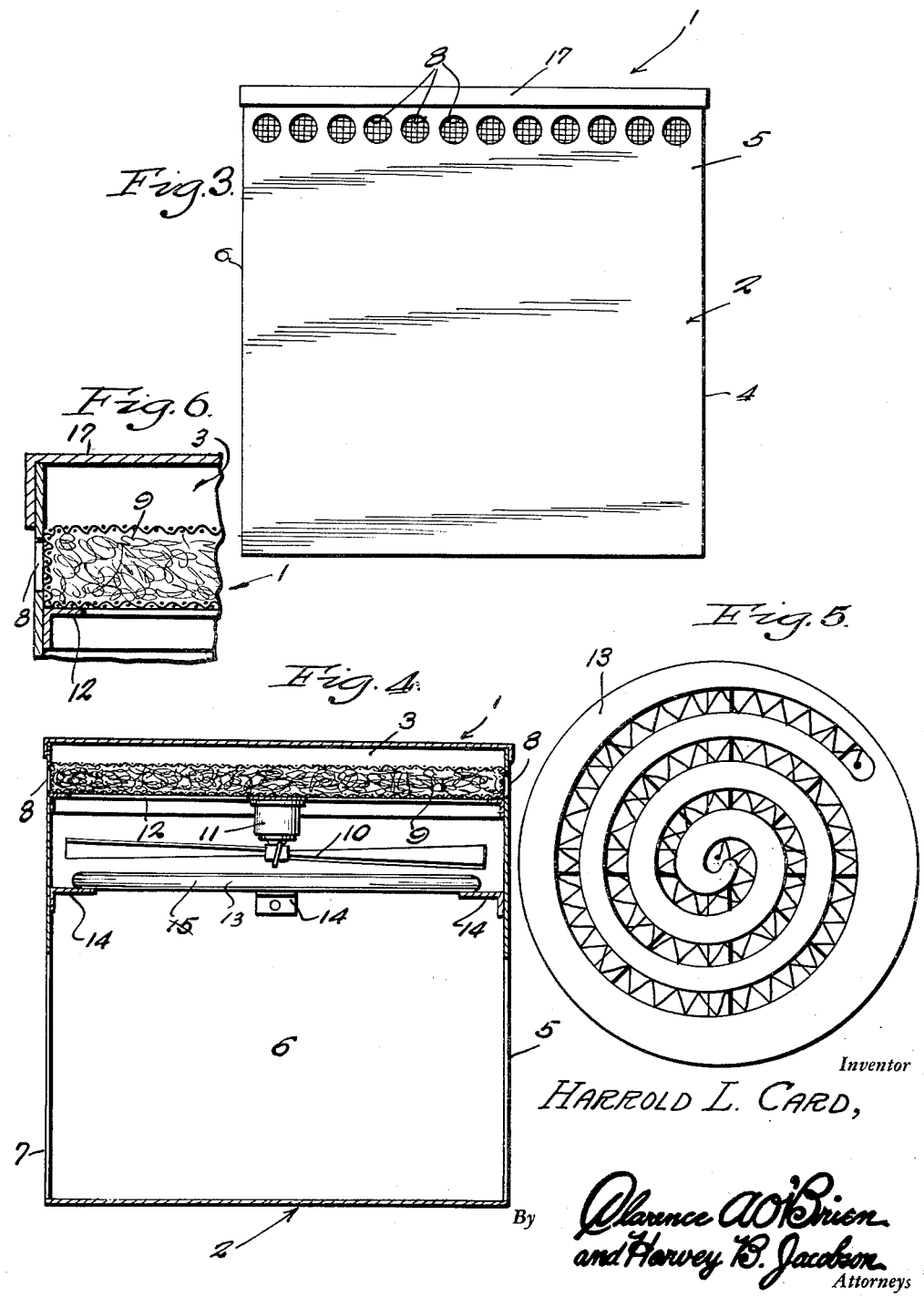
Inventor
HARROLD L. CARD, Patented Nov. 19, 1946

2,411,365

UNITED STATES PATENT OFFICE 2,411,365

DISH DRIER

Harrold L. Card, Pana, Ill.

Application October 6, 1944, Serial No. 557,468

2 Claims. (Cl. 34—82)

This invention relates to drying devices and has for its object to provide a very effective, simple, quick and inexpensive dish drying cabinet.

Another object of this invention is to provide in a dish drying cabinet means for forcing a draft of heated air directly onto the dishes being dried.

A further object of the invention is to provide a cabinet in which dishes may be dried with a direct draft of filtered and heated air.

With the above and such other objects in view as may hereinafter more fully appear, I have invented the device shown in the accompanying drawings in which:

Figure 3 is a side elevational view.

Figure 4 is a vertical sectional view of the cabinet; and

Figure 5 is a detail plan view of an electric heating element.

Figure 6 is a large broken away sectional view of a filter chamber.

Figure 1:
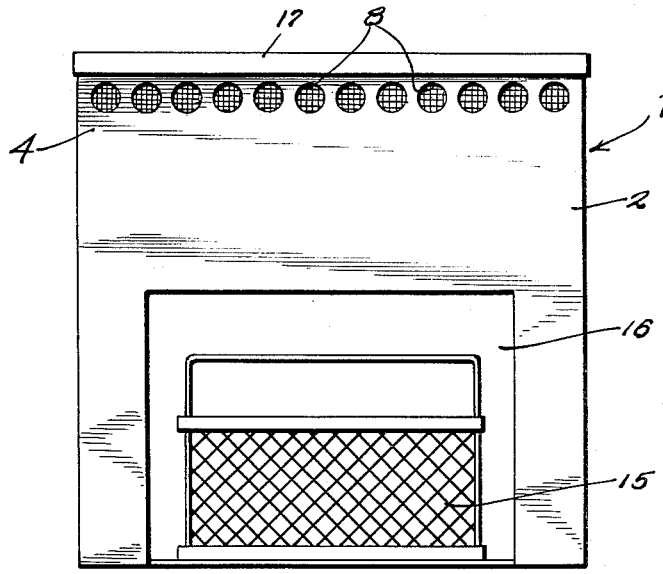
Figure 1 is a front elevational view of my drying cabinet.
Figure 2:
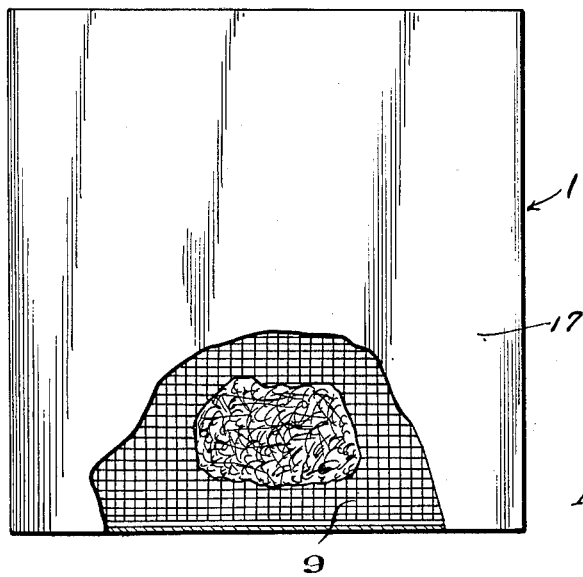
Figure 2 is a top plan view thereof.

Like reference characters indicate like parts throughout the following specification, and in the several views in the drawings in which 1 indicates my improved dish drier which consists of a cabinet 2, of equal dimensions on all sides, and for home use, preferably about 24" square. The cabinet is provided with an air intake chamber 3, and the side walls 4, 5, 6 and 7 are provided with a row of intake apertures 8 adjacent the upper ends thereof and which lead into the chamber. Directly under the chamber 3 is an air filter 9 through which air from chamber 3 is drawn by means of a fan 10 operated by an electric motor 11, supported by a cross bar 12 which bar also supports the filter 9. Air drawn through the filter by the fan is forced down over the electric heating unit 13, seated upon brackets 14 and over the tray or basket 15 and its contents whereby said contents are dried.

The front wall 4 of the cabinet is provided with a relatively large opening 16 for admitting the basket 15 and also for passage of exhaust air.

A frictionally fitted lid 17 closes the top of the cabinet but can be removed for cleaning the chamber 3 and for renewing the filter 9, when necessary.

It is thought that persons skilled in the art to which the invention belongs will be able to obtain a clear understanding of the invention after considering the description in connection with the drawings. Therefore a more lengthy description is regarded as unnecessary.

Minor changes in shape, size and rearrangement of details and parts such as come within the purview of the invention claimed may be resorted to, in actual practice, if desired.

Having now described my invention, that which I claim to be new and desire to procure by Letters Patent is:

1. A cubical dish drying cabinet having all of its side walls perforated, adjacent the upper end of the walls an imperforate top cover, a common filter covering all of said perforations, a support for the filter, a motor suspended from said support, a fan carried by the motor, a heating unit directly below the fan, an exhaust air outlet at the bottom of one wall of the cabinet, and a dish containing basket slidably seated in said outlet, whereby said exhausted air is forced over the contents of the basket on its way to the outlet.

2. A cubical dish drying cabinet having all of its side walls perforated, adjacent the upper end of the walls an imperforate top cover, a common filter covering all of said perforations, a support for the filter, a motor suspended from said support, a fan carried by the motor, a heating unit directly below the fan, an exhaust air outlet at the bottom of one wall of the cabinet, a dish containing basket slidably seated in said outlet, whereby said exhausted air is forced over the contents of the basket on its way to the outlet, and heated air passages provided entirely around the heating unit and between the same and said walls.

HARROLD L. CARD.